United States Patent [19]

Takahashi et al.

[11] Patent Number: 4,523,052

[45] Date of Patent: Jun. 11, 1985

[54] GAS-INSULATED BUSHING

[75] Inventors: Shuzou Takahashi; Hiroaki Toda, both of Yokohama, Japan

[73] Assignee: Tokyo Shibaura Denki Kabushiki Kaisha, Kawasaki, Japan

[21] Appl. No.: 495,936

[22] Filed: May 19, 1983

[30] Foreign Application Priority Data

May 19, 1982 [JP]  Japan .................................. 57-73280

[51] Int. Cl.³ ..................... H01B 17/36; H01B 17/54; H01B 17/28
[52] U.S. Cl. ............................ 174/16 BH; 174/31 R; 174/143
[58] Field of Search ........... 174/15 BH, 16 BH, 31 R, 174/142, 143

[56]  References Cited

U.S. PATENT DOCUMENTS 4,424,402  1/1984  Murase ........................... 174/16 BH

FOREIGN PATENT DOCUMENTS 46-15815  4/1971  Japan ................................... 174/143
52-8495   1/1977  Japan ................................... 174/142
52-57995  5/1977  Japan ................................. 174/16 BH
54-18720  7/1979  Japan ................................. 174/31 R Primary Examiner—Laramie E. Askin
Attorney, Agent, or Firm—Oblon, Fisher, Spivak, McClelland & Maier

[57]  ABSTRACT

A gas-insulated bushing including an insulating tube filled with an insulating gas, a central conductor centrally arranged within the insulating tube, and a capacitor unit connected to the central conductor and partitioning the interior of the insulating tube. The central conductor has an intermediate constriction to which the capacitor unit is connected and is formed of two connected conductor parts, at least one of which is terminally restricted to form the constriction. A pair of flanges is secured to the ends of respective of the conductor parts and connects the conductor parts at the constriction. A shield member is supported on one of the flanges and spaced apart from the conductor parts at the constriction in order to relieve the electric field at the constriction.

8 Claims, 7 Drawing Figures

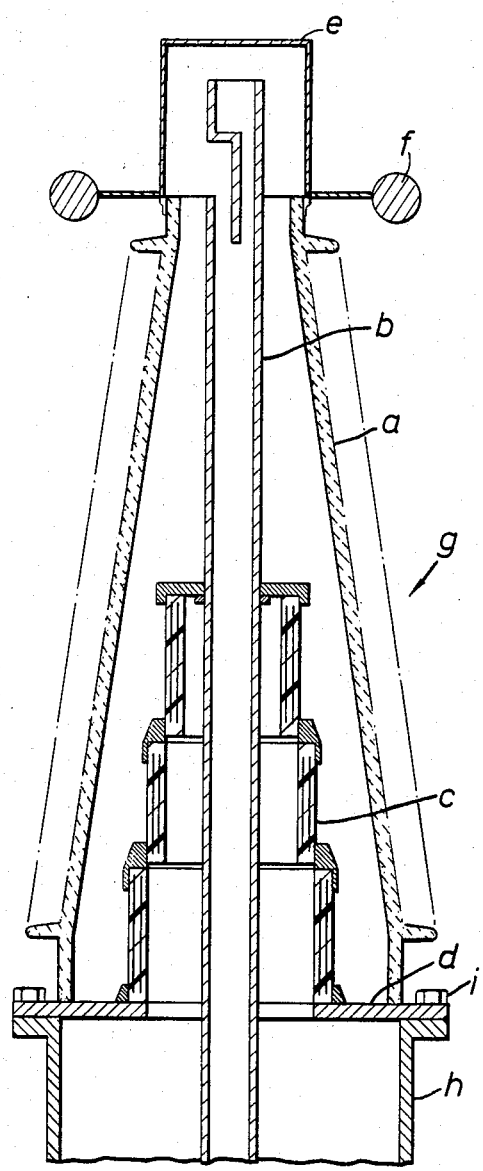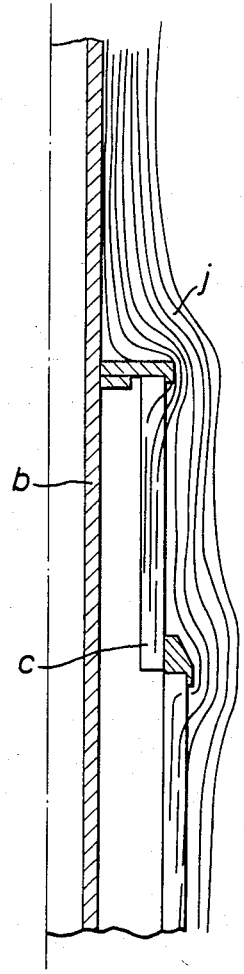
FIG.1.
PRIOR ART
FIG.2.
PRIOR ART

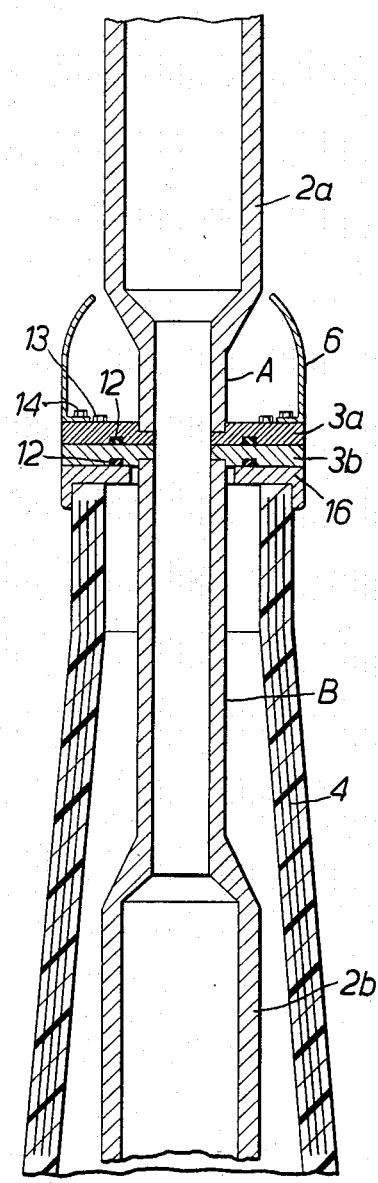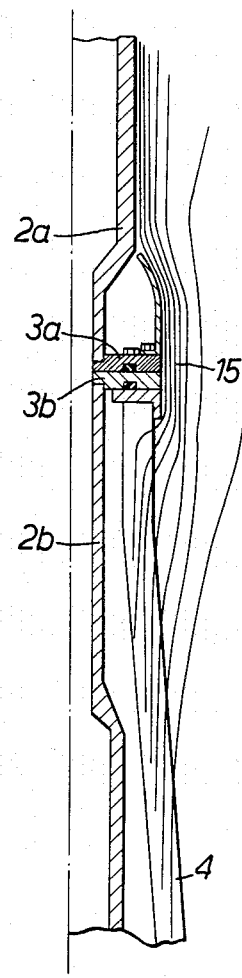
FIG.4.
FIG.5.

GAS-INSULATED BUSHING

BACKGROUND OF THE INVENTION

1. Field of the Invention

The present invention generally relates to a gas-insulated bushing having a capacitor unit, as used in high-voltage equipment, and more particularly is concerned with a gas-insulated bushing of the type including an insulating tube filled with an insulating medium, a central conductor centrally arranged within the insulating tube and a capacitor unit connected to the central conductor and partitioning the interior of the insulating tube.

2. Description of the Prior Art $SF_6$ (sulfur hexafluoride) gas-insulated bushings are now used for many types of high voltage equipment and it is anticipated that such gas bushings will also be used in UHV (Ultra High Voltage) power transmission. However, with ultra-high voltages, control of the electrical field is an important problem, and gas-insulated bushings of the stress-cone type have therefore made their appearance. In such a bushing, the electrical field is relieved by arranging a capacitor unit on the central conductor of the bushing. The capacitor unit partitions the interior of the bushing into a high-pressure region and a low-pressure region, so that the high internal gas pressure does not directly act on the external insulating tube.

FIG. 1 shows the structure of a prior art stress-cone bushing (g). A central conductor b is provided in the center of insulating tube a. On the central conductor b and concentrically therewith is arranged a capacitor unit c having a stepped cylindrical configuration. The capacitor unit c relieves the electrical field within the bushing and partitions the gas into a high-pressure region within capacitor unit c and a low-pressure region between capacitor unit c and the insulating tube a.

A cooling case e at the top of insulating tube a is connected to the central conductor b and removes heat within the bushing. A shield ring f is also located at the top of insulating tube a to relieve the electrical field in the upper region of the bushing. The bushing g constructed as above described is supplied for use fixed to a tube base h by bolts i. In the above structure, the portion which connects central conductor b and capacitor unit c and which projects sharply from central conductor b is necessarily large. Because of the concentration of the electric field j as shown in FIG. 2 and the consequential risk of insulation breakdown, insulating tube a is required to have considerable size.

SUMMARY OF THE INVENTION

Accordingly, one object of this invention is to provide a novel gas-insulated bushing of the type described in which the electric field at the region where the capacitor unit is connected to the central conductor can be relieved to enable the bushing to be capable of withstanding high voltage.

This and other objects are achieved according to the invention, by providing a new and improved gas-insulated bushing in which the central conductor is formed with an intermediate constriction to which the capacitor unit is connected, and a flange-mounted shield member is supported spaced apart from the central conductor at the constriction in order to relieve the electric field at the constriction.

BRIEF DESCRIPTION OF THE DRAWINGS

A more complete appreciation of the invention will be readily obtained as the same becomes better understood by reference to the following detailed description when considered in connection with the accompanying drawings, wherein:

FIG. 1 is a longitudinal cross-sectional view of the structure of a conventional gas-insulated;

FIG. 2 is an enlarged view of an intermediate portion of the central conductor shown in FIG. 1 illustrating diagrammatically the electric field at the intermediate portion of the central conductor;

FIG. 4 is an enlarged view of an intermediate portion of the central conductor shown in FIG. 3;

FIG. 5 is a diagrammatic view of the electric field of the intermediate portion of the central conductor shown in FIG. 4;

DESCRIPTION OF THE PREFERRED EMBODIMENTS

Figure 3:
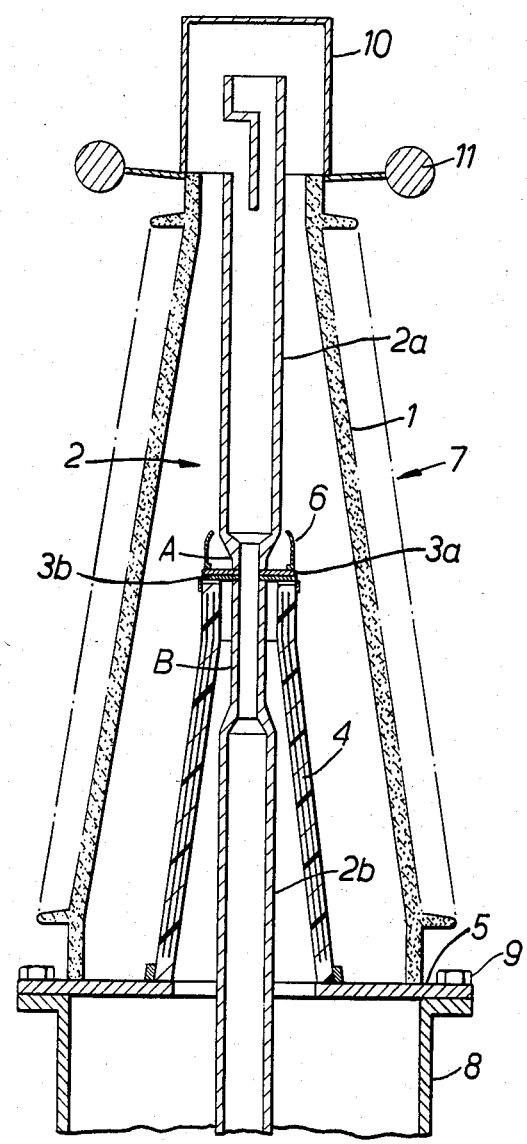
FIG. 3 is a longitudinal cross-sectional view of the structure of a gas-insulated bushing according to this invention.

Referring now to the drawings, wherein like reference numerals designate identical or corresponding parts throughout the several views, and more particularly to FIG. 3 thereof, one preferred embodiment of a gas-insulated bushing in accordance with this invention is shown as including a central conductor 2 constituted by an upper conductor part 2a and a lower conductor part 2b aligned with the part 2a.

The central conductor 2 has an intermediate constriction formed by constriction portions A and B of the parts 2a, 2b. The central conductor parts 2a and 2b at the center of an insulating tube 1 are coupled through respective flanges 3a and 3b welded to ends of conductor parts 2a and 2b. An integral, one-piece, capacitor unit 4 is fixed between the bottom flange 3b of central conductor part 2b and a fixed flange 5, to partition the interior of the bushing into a high pressure region and a low pressure region and to relieve the electric field in the bushing. The integral capacitor unit 4 is shaped as a truncated circular cone, and thus differs from the prior art capacitor unit, which is a multi-stage stacked arrangement of cylindrical capacitors.

A shield 6 is fixed to the upper flange 3a to relieve the concentration of the electric field produced by the stepwise difference of the diameters of the upper flange 3a and the central conductor part 2a. The bushing 7 which is thus formed is clamped to tube base 8 by bolts 9 and can then be supplied ready to be used. Numeral 10 designates a cooling case, and numeral 11 designates a shield ring.

FIG. 4 is an enlarged view of the constricted part of the central conductor 2. O-rings 12, 12 are inserted between the flanges 3a and 3b and between the flange 3b and a mounting 16 for the capacitor unit 4, to preserve the pressure difference between the interior of the integral capacitor unit 4 and the space bounded by tube 1, unit 4 and central conductor part 2a. The mounting 16 of capacitor unit 14 is joined to the lower flange 3b and the shield 6 is joined to the upper flange 3a by means of respective bolts 13 and 14.

By adopting the structure shown in FIG. 4, in which flanges are provided on the constricted, i.e., smaller diameter parts A, B of the central conductor parts 2a, 2b, and the capacitor unit 4 is connected thereto, the upper part of the capacitor unit 4 can be made to have a diameter that is not much different from that of the original central conductor. The diameter of insulating tube 1 decreases in the upwards direction, so by this method the space between the capacitor and the insulating tube 1 can be made greater than in the conventional structure. This has the advantage that the insulating distance can also be made larger. Furthermore, the diameters of the capacitor unit 4 and upper and lower flanges 3a and 3b which constitute projections from the central conductor parts 2a and 2b can be made smaller than in the case of the prior art. Also, by means of the provision of the shield 6, as shown in FIG. 5, the degree of concentration of the electric field 15 at the step from the upper flange 3a to the upper part 2a of the central conductor can be relieved. With the previous arrangement, shown in FIG. 1, the capacitor unit c has a multistage stacked configuration, producing a complex distribution of the electric field j, as shown in FIG. 2. In contrast, if the present design is used, the electric field 15 within the integral capacitor unit 4 and the electric field 15 produced by the shield 6 at the connection region have smoother flows, as can be seen from FIG. 5.

The formation of the constriction in the central conductor does lead to the generation of some heat in the region of the constriction. However, the upper and lower flanges 3a and 3b act as fins, to dissipate heat adequately. Since the insulating tube length of a UHV bushing is, for instance, 10 m or more, the central conductor is required to have a certain amount of strength. In this respect, the strength is somewhat reduced by the constriction of the central conductor 2, but the fixed support provided at the intermediate point of the central conductor by the capacitor unit 4 gives sufficient compensation to make the bushing earthquake-proof and vibration-proof.

Figure 6:
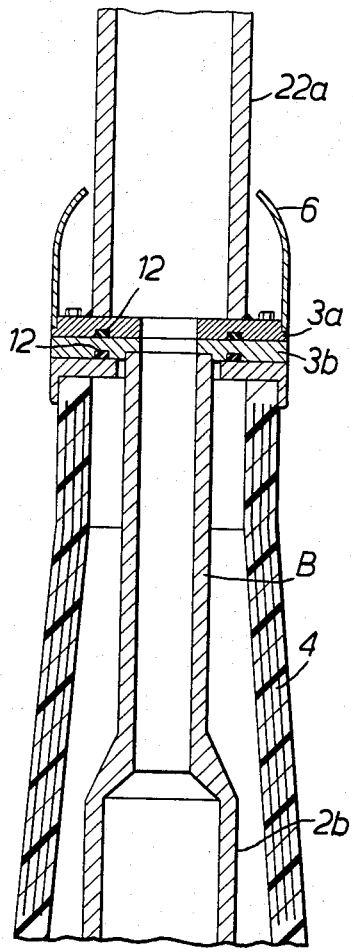
FIG. 6 is a longitudinal cross-sectional view showing a modified gas-insulated bushing according to this invention.

FIG. 6 illustrates an alternative and preferred embodiment of the central conductor. As there shown, the constricted upper part 2a of FIG. 4 is replaced by an unconstricted central conductor part 22a connected with upper flange 3a, the constriction of the central conductor being then constituted solely by the portion B of part 2b. The use of straight central conductor 22a facilitates manufacture by dispensing with the constriction portion A of central conductor part 2a shown in FIGS. 3, 4 and 5. In addition, the mechanical strength of the central conductor is greater than that of the central conductor 2 shown in FIGS. 3, 4 and 5.

Figure 7:
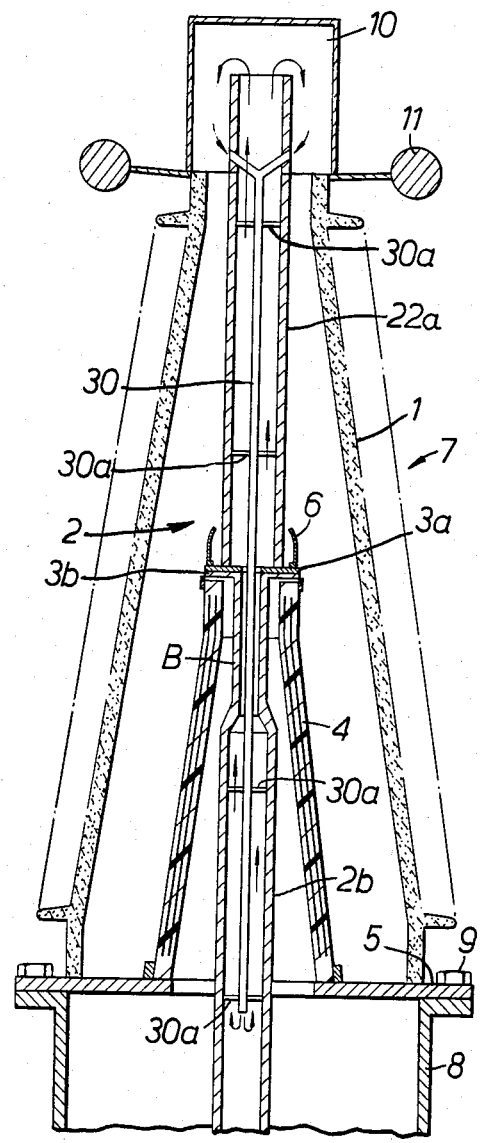
FIG. 7 is a longitudinal cross-sectional view illustrating alternative embodiments of the gas-insulated bushing according to this invention.

Still another alternative and preferred embodiment of a gas-insulated bushing according to the present invention is shown in FIG. 7, which illustrates an arrangement for removing heat applicable to either of the embodiments shown in FIG. 3 or 6. To remove the heat generated at constricted portions A and B of central conductors 22a and 2b, a circulation pipe 30 is mounted axially within central conductor 2 by suitable supporting members 30a. The lower end of pipe 30 opens to the interior of part 2b at the level of the base 8, while the upper end opens to the cooling case 10, as shown.

The gas heated within the central conductor 2, and especially in the constriction portion thereof, flows into cooling case 10 through the space between central conductor and circulation pipe 30 as shown by the arrows. After being cooled, the gas is then led to the vicinity of tube base 8 via the circulation pipe 30.

It should now be apparent that in accordance with the teachings of the present invention, a gas-insulated bushing for use in UHV systems, etc. can be provided which can relieve the electric field concentration in the region where the capacitor unit is connected to the central conductor, thus providing a gas-insulated bushing able to withstand high voltage.

Obviously, many modifications and variations of the present invention are possible in the light of the teachings of the present invention. It is therefore to be understood that within the scope of the appended claims, the invention may be practiced otherwise than as specifically described herein.

What is claimed as new and desired to be secured by Letters Patent of the United States is:

1. A gas-insulated bushing comprising:
   an insulating tube filled with an insulating gas;
   a central conductor centrally arranged within the insulating tube;
   a capacitor unit connected to the central conductor and partitioning the interior of the insulating tube;
   said central conductor having an intermediate constriction to which the capacitor unit is connected, said central conductor comprising two connected conductor parts, at least one of which is terminally restricted to form said constriction;
   a pair of flanges secured to the ends of respective of said conductor parts and connecting said conductor parts at said constriction; and
   a shield member supported on one of said flanges spaced apart from said conductor parts at the constriction in order to relieve the electric field at the constriction.

2. A gas-insulated bushing according to claim 1, comprising:
   a circulation tube mounted in said central conductor for circulating a cooling medium within the central conductor.

3. A gas-insulated bushing according to claim 1, wherein the capacitor unit is of integral construction and is of truncated circular conical form.

4. A gas-insulated bushing according to claim 3, wherein the capacitor unit is secured to the other of the flanges.

5. A gas-insulated bushing according to claim 4, comprising:
   a circulation tube mounted in said central conductor for circulating a cooling medium within the central conductor.

6. A gas-insulated bushing according to claim 3, comprising:
   a circulation tube mounted in said central conductor for circulating a cooling medium within the central conductor.

7. A gas-insulated bushing according to claim 1, wherein the capacitor unit is secured to the other of the flanges.

8. A gas-insulated bushing according to claim 7, comprising:
   a circulation tube mounted in said central conductor for circulating a cooling medium within the central conductor.

* * * * *